United States Patent
Sugaya et al.

(10) Patent No.: US 11,264,649 B2
(45) Date of Patent: Mar. 1, 2022

(54) CYLINDRICAL NONAQUEOUS ELECTROLYTE SECONDARY BATTERY

(71) Applicant: SANYO Electric Co., Ltd., Daito (JP)

(72) Inventors: Junichi Sugaya, Osaka (JP); Atsushi Mizawa, Osaka (JP); Yuji Yamagami, Osaka (JP); Tomomichi Ueda, Osaka (JP); Masahiro Nakamura, Osaka (JP)

(73) Assignee: SANYO Electric Co., Ltd., Daito (JP)

( * ) Notice: Subject to any disclaimer, the term of this patent is extended or adjusted under 35 U.S.C. 154(b) by 221 days.

(21) Appl. No.: 16/470,351

(22) PCT Filed: Dec. 11, 2017

(86) PCT No.: PCT/JP2017/044291
§ 371 (c)(1),
(2) Date: Jun. 17, 2019

(87) PCT Pub. No.: WO2018/116876
PCT Pub. Date: Jun. 28, 2018

(65) Prior Publication Data
US 2020/0119406 A1   Apr. 16, 2020

(30) Foreign Application Priority Data
Dec. 22, 2016   (JP) .............................. JP2016-249105

(51) Int. Cl.
*H01M 10/0587* (2010.01)
*H01M 10/0525* (2010.01)
(Continued)

(52) U.S. Cl.
CPC ......... *H01M 10/0587* (2013.01); *H01M 4/13* (2013.01); *H01M 4/483* (2013.01);
(Continued)

(58) Field of Classification Search
CPC ...................... H01M 10/0431; H01M 10/0587
See application file for complete search history.

(56) References Cited

U.S. PATENT DOCUMENTS

| | | |
|---|---|---|
| 5,989,743 A | 11/1999 | Yamashita |
| 2003/0072993 A1 | 4/2003 | Kim et al. |

(Continued)

FOREIGN PATENT DOCUMENTS

| | | |
|---|---|---|
| JP | 8-153542 A | 6/1996 |
| JP | 2003-123829 A | 4/2003 |

(Continued)

OTHER PUBLICATIONS

International Search Report dated Mar. 6, 2018, issued in counterpart International Application No. PCT/JP2017/044291 (2 pages).

*Primary Examiner* — Jonathan Crepeau
(74) *Attorney, Agent, or Firm* — Westerman, Hattori, Daniels & Adrian, LLP

(57) ABSTRACT

A nonaqueous electrolyte secondary battery according to an embodiment of the present disclosure includes: a wound electrode assembly (14) formed by spirally winding, via a separator (13), a positive electrode (11) and a negative electrode (12) in which a negative electrode mixture layer is formed on a negative electrode core, where: the negative electrode (12) includes a non-opposing portion (12a) that is wound 1.25 turns or more from an inner edge in a winding direction of the wound electrode assembly (14) without facing the positive electrode via the separator (13); the non-opposing portion (12a) includes a negative electrode mixture layer-formed portion (12c) in which the negative electrode mixture layer is formed on at least either side continuously in an inward winding direction from an outer edge in the winding direction; and the negative electrode mixture layer-formed portion (12c) is wound 0.75 turns or more.

4 Claims, 3 Drawing Sheets

(51) Int. Cl.
  *H01M 10/04*   (2006.01)
  *H01M 4/48*    (2010.01)
  *H01M 4/13*    (2010.01)
  *H01M 4/02*    (2006.01)

(52) U.S. Cl.
  CPC ... *H01M 10/0431* (2013.01); *H01M 10/0525* (2013.01); *H01M 2004/027* (2013.01)

(56)                References Cited

U.S. PATENT DOCUMENTS

| 2004/0033419 | A1 | 2/2004  | Funabiki        |
| 2004/0265700 | A1 | 12/2004 | Ugawa et al.    |
| 2008/0280193 | A1 | 11/2008 | Takagi et al.   |
| 2011/0076534 | A1 | 3/2011  | Kobayashi et al.|

FOREIGN PATENT DOCUMENTS

| JP | 2004-071542 A |   | 3/2004  |
| JP | 2004-273153 A |   | 9/2004  |
| JP | 2004-356047 A |   | 12/2004 |
| JP | 2007-311139 A |   | 11/2007 |
| JP | 2009-151977 A |   | 7/2009  |
| JP | 2011-91020 A  |   | 5/2011  |
| JP | 2013-137946   | * | 7/2013  |
| JP | 2014-60063 A  |   | 4/2014  |
| JP | 2016-076292 A |   | 5/2016  |

* cited by examiner

CYLINDRICAL NONAQUEOUS ELECTROLYTE SECONDARY BATTERY

TECHNICAL FIELD

The present disclosure relates to a cylindrical nonaqueous electrolyte secondary battery.

BACKGROUND ART

A cylindrical nonaqueous electrolyte secondary battery includes a wound electrode assembly formed by spirally winding a positive electrode and a negative electrode via a separator and is formed by housing the wound electrode as in a package. In recent years, nonaqueous electrolyte secondary batteries, such as lithium-ion secondary batteries, have been employed as power sources for electric vehicles (EV), large-scale electricity storage systems, and the like. When lithium-ion secondary batteries are used as power sources for EV, electricity storage systems, and the like, many cylindrical secondary batteries are electrically connected and used as a module in some instances. For example, many secondary batteries are connected in series or in parallel into a module in some instances.

Patent Literature (PTL) 1 discloses, in FIG. 6 and the description therefor, a configuration of a nonaqueous secondary battery including a wound electrode assembly in which a positive electrode metal foil is exposed over about 2 turns from the inner circumferential end of the positive electrode metal foil without having a positive electrode active material layer on both sides. In this configuration, the positive electrode metal foil-exposed portion faces, via a separator, a negative electrode portion (both-sides negative electrode-uncoated portion) in which a negative electrode metal foil corresponding to a negative electrode core is exposed over about 1 turn from the inner circumferential edge without having a negative electrode active material on both sides. In addition, the positive electrode metal foil-exposed portion faces, following the both-sides negative electrode-uncoated portion, a portion (one-side negative electrode-uncoated portion) in which the negative electrode metal foil is exposed over about 1 turn without having a negative electrode active material on one side.

CITATION LIST

Patent Literature

PTL 1: Japanese Published Unexamined Patent Application No. 8-153542

SUMMARY OF INVENTION

Technical Problem

When many secondary batteries are connected into a module as described above, not only maximizing the energy density of individual secondary batteries, but also arranging a plurality of secondary batteries highly densely is desirable to maximize energy density. However, when secondary batteries are arranged highly densely and one of the secondary batteries catches fire, other secondary batteries are readily affected by explosion of the secondary battery due to increased internal pressure. For this reason, it is desirable to ensure an exhaust passage to suppress an increase in internal pressure in case a secondary battery catches fire. Since an explosion-proof valve is often provided in a seal and/or at the bottom of a battery case particularly in a cylindrical secondary battery, it is desirable to ensure an exhaust passage that guides a gas in the vertical direction at the winding core of the wound electrode assembly.

Meanwhile, it is possible to suppress an explosion by arranging a tubular member, called a center pin made from a metal material, such as iron, at the winding core inside a secondary battery, thereby ensuring an exhaust passage in the central portion and of discharging a gas in the vertical direction in case the secondary battery catches tire. In this instance, however, an increased number of parts may result in an increased cost.

Further, in the configuration disclosed in PTL 1, the negative electrode core having low strength is exposed on both sides of almost the entire portion that does not face the positive electrode near the inner edge in the winding direction of the negative electrode. In such a configuration, it is difficult to ensure an exhaust passage at the winding core when a secondary battery catches fire.

An object of the present disclosure is to realize at a low cost a structure of a cylindrical nonaqueous electrolyte secondary battery that can ensure an exhaust passage at the winding core of a wound electrode assembly in case of fire.

Solution to Problem

A cylindrical nonaqueous electrolyte secondary battery of an embodiment of the present disclosure includes: a wound electrode assembly formed by spirally winding, via a separator, a positive electrode and a negative electrode in which a negative electrode mixture layer is formed on a negative electrode core; a nonaqueous electrolyte; and a package that houses the wound electrode assembly and the nonaqueous electrolyte, where: the negative electrode includes a non-opposing portion that is wound 1.25 turns or more from an inner edge in a winding direction of the wound electrode assembly without facing the positive electrode via the separator; the non-opposing portion includes a negative electrode mixture layer-formed portion in which the negative electrode mixture layer is formed on at least either side continuously in an inward winding direction from an outer edge in the winding direction; and the negative electrode mixture layer-formed portion is wound 0.75 turns or more.

Advantageous Effects of Invention

According to a cylindrical nonaqueous electrolyte secondary battery of the present disclosure, it is possible to realize at a low cost a structure that can ensure an exhaust passage at the winding core of a wound electrode assembly in case of fire.

DESCRIPTION OF EMBODIMENTS

Hereinafter, an exemplary embodiment will be described in detail. Since the drawings that will be referred to in the description of the embodiments are schematically illustrated, specific dimensions and the like of each component should be determined by taking into account the following description. The term "almost" will be explained by using "almost the same" as an example. Use of this term herein is intended to encompass not only a thing that is identical, but also a thing that is considered to be substantially the same. Moreover, the term "end" means the edge and the vicinity of the edge of an object, and the term "central portion" means the center and the vicinity of the center of an object. Shapes, materials, the number of members, and numerical values in the following description are examples for illustration and may be changed appropriately in accordance with the use of nonaqueous electrolyte secondary batteries. Hereinafter, equivalent elements will be denoted by the same reference sign in all the drawings and described accordingly.

Figure 1:
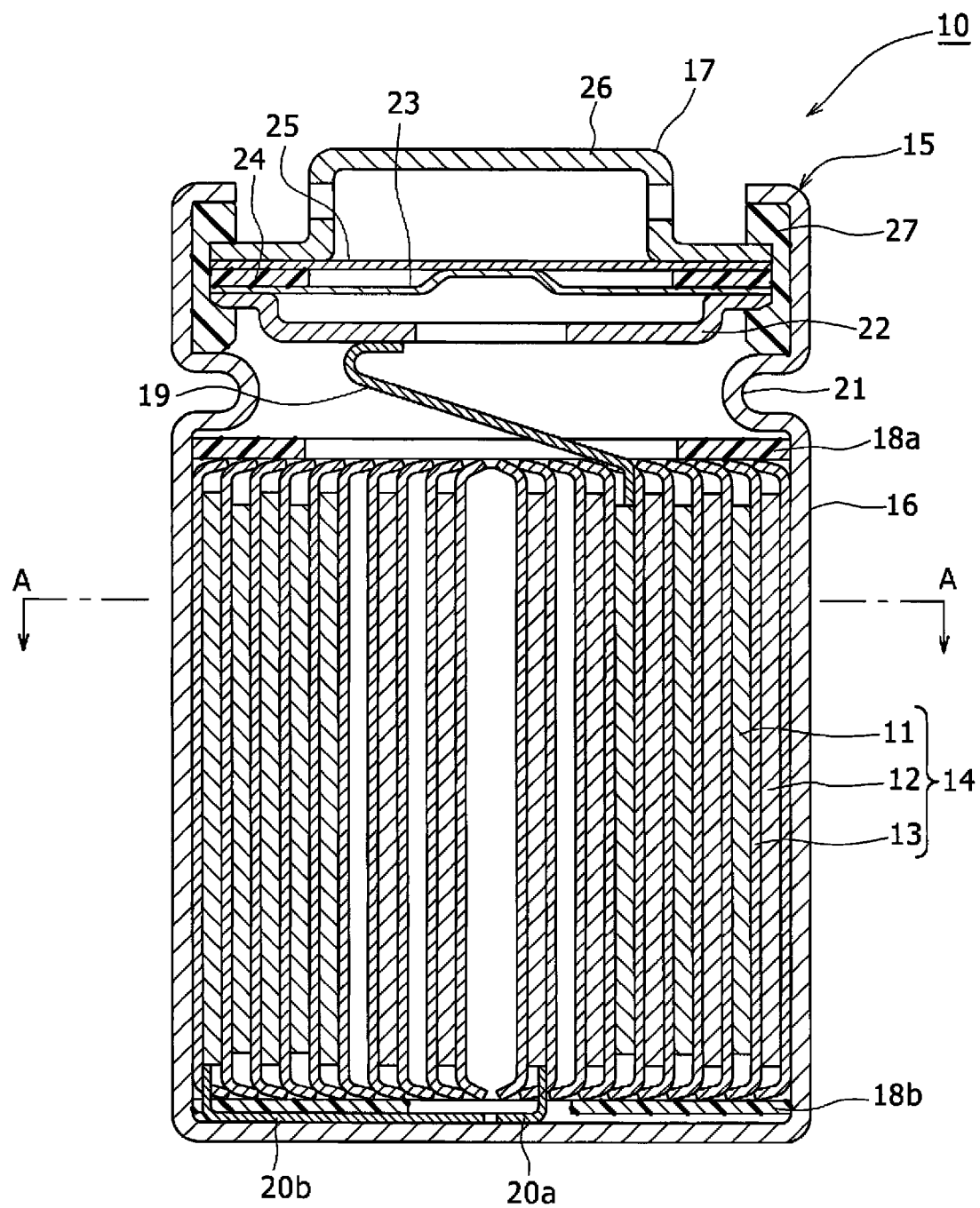
FIG. 1 is a cross-sectional view of a cylindrical nonaqueous electrolyte secondary battery of an exemplary embodiment.
Figure 2:
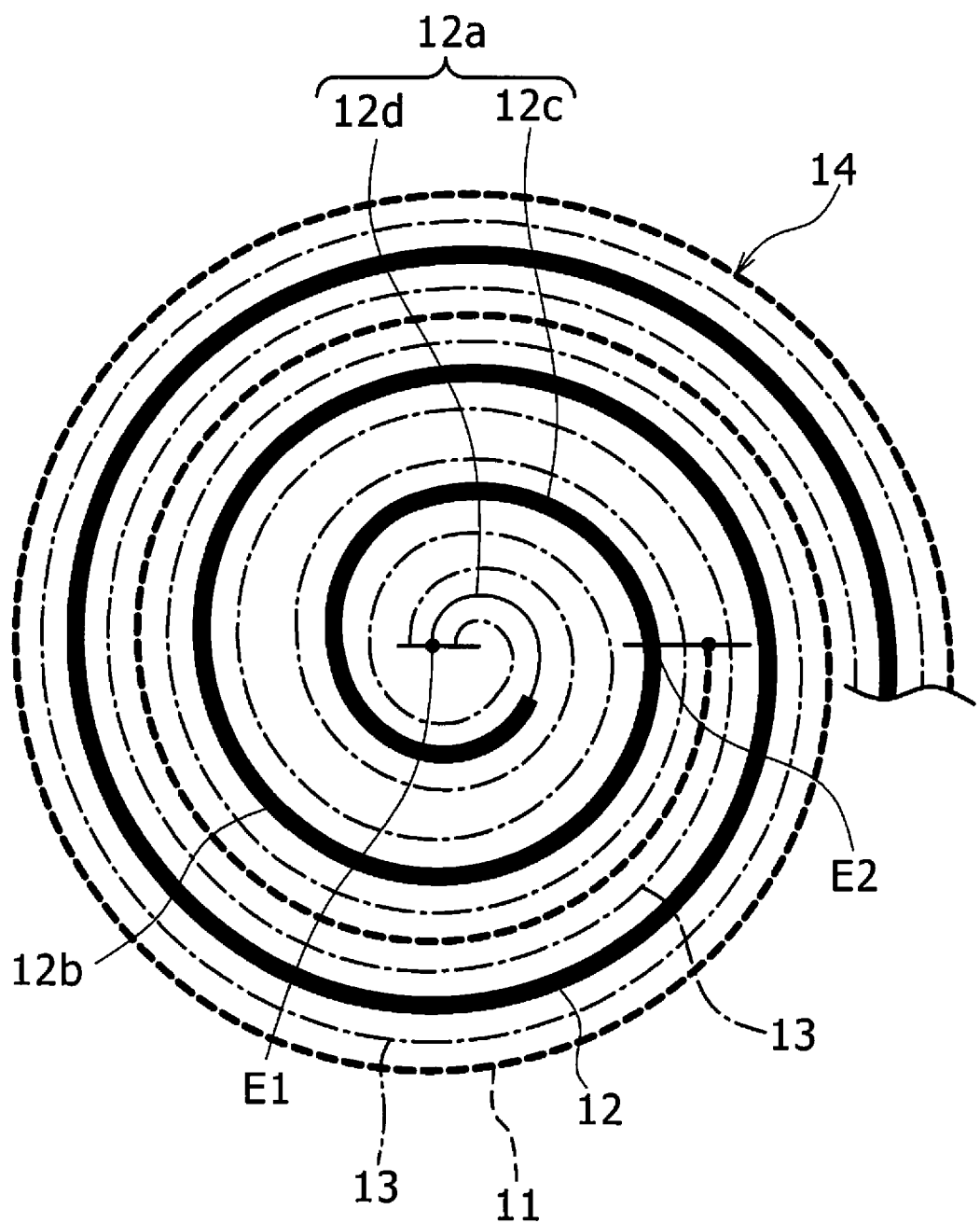
FIG. 2 schematically illustrates a portion near an inner edge in the winding direction of a wound electrode assembly in the A-A cross-section of FIG. 1.

FIG. 1 is a cross-sectional view of a cylindrical nonaqueous electrolyte secondary battery 10 of an exemplary embodiment. FIG. 2 schematically illustrates a portion near the inner edge in the winding direction of the wound electrode assembly in the A-A cross-section of FIG. 1.

As illustrated in FIG. 1, the nonaqueous electrolyte secondary battery 10 includes a wound electrode assembly 14, a nonaqueous electrolyte (not shown), and a battery case 15 as a package. Hereinafter, the nonaqueous electrolyte secondary battery 10 is mentioned as the secondary battery 10, and the wound electrode assembly 14 is mentioned as the electrode assembly 14. The electrode assembly 14 includes a positive electrode 11, a negative electrode 12, and a separator 13 and is formed by spirally winding the positive electrode 11 and the negative electrode 12 via the separator 13, as illustrated in FIG. 2. In FIG. 2, to clarify the arrangement relationship, the negative electrode 12 is represented by a solid line, the positive electrode 11 is represented by a dashed line, and the separator 13 is represented by a dash-dot line. Moreover, in FIG. 1, to clarify the arrangement relationship among the positive electrode 11, the negative electrode 12, and the separator 13 in the electrode assembly 14, the positive electrode, the negative electrode, and the separator are illustrated to exaggerate the respective thicknesses by decreasing the winding number compared with an actual instance. Further, in FIG. 2, the positive electrode 11, the negative electrode 12, and the separator 13 are illustrated to exaggerate gaps therebetween.

The nonaqueous electrolyte includes a nonaqueous solvent and an electrolyte salt dissolved in the nonaqueous solvent. The nonaqueous electrolyte is not limited to a liquid electrolyte and may be a solid electrolyte, such as a gel polymer. Hereinafter, one side in the winding axis direction of the electrode assembly 14 is referred to as "the upper side" and the other side in the winding axis direction is referred to as "the lower side" in some instances.

The positive electrode 11, the negative electrode 12, 0 and the separator 13 that constitute the electrode assembly 14 are all formed as strips and spirally wound to be stacked alternately in the radial direction of the electrode assembly 14. In the electrode assembly 14, the longitudinal direction of each electrode is the winding direction and the width direction of each electrode is the winding axis direction. As illustrated in FIG. 1, a positive electrode lead 19 that electrically connects the positive electrode 11 to a positive electrode terminal is provided, for example, at almost the center between the winding inner end and the winding outer end of the electrode assembly 14 and protrudes from the upper edge of the electrode group. Negative electrode leads 20a and 20b are provided, for example, in the winding inner end of the electrode assembly 14 and the winding outer end of the electrode assembly 14, respectively, and protrude from the lower edge of the electrode group.

As illustrated in FIG. 1 and FIG. 2, only the negative electrode 12, out of the positive electrode 11 and the negative electrode 12, is arranged in a portion of the electrode assembly 14 where the winding starts. Specifically, the negative electrode 12 includes a non-opposing portion 12a wound 1.25 turns or more, without facing the positive electrode 11 via the separator 13, from the inner edge (point E1 in FIG. 2) in the winding direction, which is the edge where the winding of the electrode assembly 14 starts. In FIG. 2, the negative electrode 12 includes: a non-opposing portion 12a that is wound 1.5 turns from the inner edge E1 in the winding direction; and an opposing portion 12b that is wound continuously from the non-opposing portion 12a and faces the positive electrode 11 via the separator 13. In the negative electrode 12 illustrated in FIG. 2, the non-opposing portion 12a is a portion that extends in the winding direction from the inner edge E1 in the winding direction to the point E2. In FIG. 2, a straight line passing through E2 is drawn such that the distance from the inner edge in the winding direction of the positive electrode 11 to the negative electrode 12 on the winding inner side thereof becomes the shortest. And an intersection E2 of the straight line and the negative electrode 12 corresponds to the outer edge in the winding direction of the non-opposing portion 12a. In addition, a straight line passing through E1 is drawn to be arranged as an extension of the straight line passing through E2.

Further, the non-opposing portion 12a includes a negative electrode mixture layer-formed portion 12c and a negative electrode core-exposed portion 12d. The negative electrode mixture layer-formed portion 12c is a portion where a negative electrode mixture layer is formed on at least either side continuously in the inward winding direction from the outer edge (point E2 in FIG. 2) in the winding direction of the non-opposing portion 12a. The negative electrode core-exposed portion 12d is a portion where a negative electrode mixture layer is not formed on either side continuously in the outward winding direction from the inner edge (point E1 in FIG. 2) in the winding direction of the non-opposing portion 12a. In FIG. 2, the negative electrode core-exposed portion 12d is represented by a thin solid line, and the negative electrode mixture layer-formed portion 12c is represented by a thick solid line. The negative electrode mixture layer-formed portion 12c is wound 0.75 turns or more. The example of FIG. 2 illustrates an instance in which the negative electrode mixture layer-formed portion 12c is wound 0.6 turns. By such a configuration, as described hereinafter, it is possible to realize at a low cost a structure that can ensure an exhaust passage at the winding core of the electrode assembly 14 in case the secondary battery 10 catches fire.

In the example illustrated in FIG. 1, a case body 16, which is a flat-bottomed cylindrical metallic container, and a seal 17 constitute a metallic battery case 15 that houses the electrode assembly 14 and a nonaqueous electrolyte. Insulating plates 18a and 18b are provided on the upper side and the lower side, respectively, of the electrode assembly 14. The positive electrode lead 19 is connected to the positive electrode 11 and extends outside the electrode assembly 14 in the winding axis direction. The positive electrode lead 19 then extends through a through hole of the insulating plate 18a to the side of the seal 17 and is welded to the lower surface of a filter 22, which is a bottom plate of the seal 17. In the secondary battery 10, a cap 25, which is a top plate of the seal 17 that is electrically connected to the filter 22, constitutes a positive electrode terminal. Meanwhile, in the negative electrode 12, both negative electrode leads 20a and 20b extend to the bottom side of the case body 16 and are connected to the bottom inner surface of the case body 16 by welding. In the secondary battery 10, the case body 16 constitutes a negative electrode terminal.

Between the case body 16 and the seal 17, a gasket 27 is provided to ensure sealing of the inside of the battery case 15. The case body 16 has an overhanging portion 21 that is formed, for example, by pressing the side surface portion from the outside and that supports the seal 17. The overhanging portion 21 is preferably formed circularly in the circumferential direction of the case body 16 and supports the seal 17 by using its upper surface.

The seal 17 has a stacked structure consisting of the filter 22, a lower valve 23, an insulator 24, an upper valve 25, and the cap 26 in this order from the side of the electrode assembly 14. Each member that constitutes the seal 17 has a disk or ring shape, for example, and the members excluding the insulator 24 are electrically connected to each other. The lower valve 23 and the upper valve 25 are connected to each other in the respective central portions, and the insulator 24 is disposed between these valves at their peripheries. Since the lower valve has a vent, the upper valve 25 swells to the side of the cap 26 and moves away from the lower valve 23 upon an increase in internal pressure of the battery due to abnormal heat generation, thereby breaking the electric connection between these valves. Upon a further increase in internal pressure, the upper valve 25 fractures, thereby discharging a gas from an opening of the cap 26. In the embodiment, it is possible to suppress an increase in internal pressure in case the secondary battery 10 catches fire by efficiently guiding in the vertical direction a high-pressure, high temperature gas generated in the central portion within the secondary battery 10 as described hereinafter, thereby efficiently discharging the gas through a fractured portion of the upper valve 25.

Next, the configuration of the positive electrode 11, the negative electrode 12, and the separator 13 will be described in detail. The positive electrode 11 includes a rectangular positive electrode core and a positive electrode mixture layer. The positive electrode mixture layer contains a positive electrode active material and a binder and is formed on the positive electrode core. A suitable example of the positive electrode core is a metal foil based on aluminum or an aluminum alloy. The thickness of the positive electrode core is 5 µm to 30 µm, for example. The positive electrode lead 19 is connected to a side surface of an exposed surface portion of the positive electrode core at the upper end of the positive electrode 11.

The positive electrode mixture layer is suitably formed on each side in the thickness direction of the positive electrode core. The positive electrode mixture layer contains a positive electrode active material, a binder, and an electric conductor, for example. The positive electrode 11 can be fabricated by applying a positive electrode mixture slurry containing a positive electrode active material, a binder, an electric conductor, and a solvent, such as N-methyl-2-pyrrolidone (NMP), to both sides of a positive electrode core and compressing the resulting coating films.

The positive electrode 11 can intercalate lithium ions. Examples of the positive electrode active material for this purpose include lithium transition metal oxides containing transition metal elements, such as Co, Mn, and Ni. Such lithium transition metal oxides are not particularly limited, but are preferably complex oxides represented by a general formula of $Li_{1+x}MO_2$ ($-0.2<x\leq 0.2$, M includes at least one of Ni, Co, Mn, and Al). Examples of the electric conductor include carbon materials, such as carbon black, acetylene black, Ketjen black, and graphite. These carbon materials may be used alone or in combination.

Examples of the binder include fluororesins, such as polytetrafluoroethylene (PTFE) and poles vinylidene fluoride (PVdF); polyacrylonitrile (PAN); polyimides; acrylic resins; and polyolefins. In addition, these resins may be used together with carboxymethyl cellulose (CMC) or a salt thereof, polyethylene oxide (PEO), or the like. These binders may be used alone or in combination.

Figure 3:
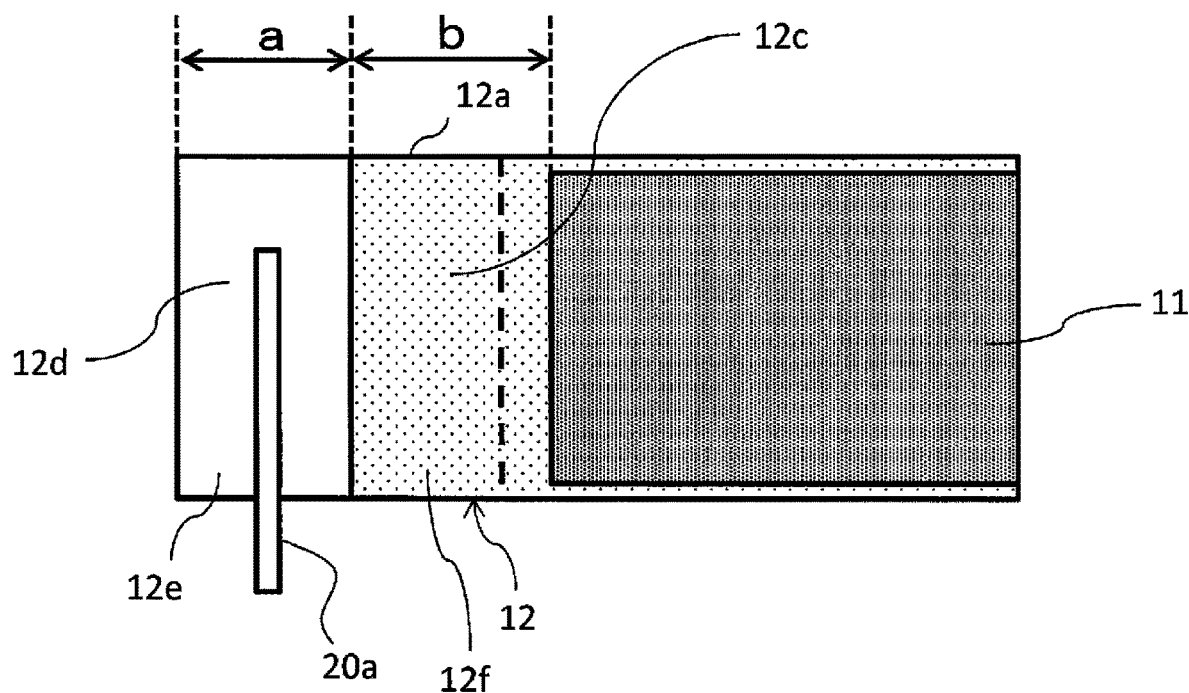
FIG. 3 illustrates an opposing relationship between a positive electrode and a negative electrode by unfolding a portion near the inner edge in the winding direction of the wound electrode assembly of FIG. 1.
Figure 4:
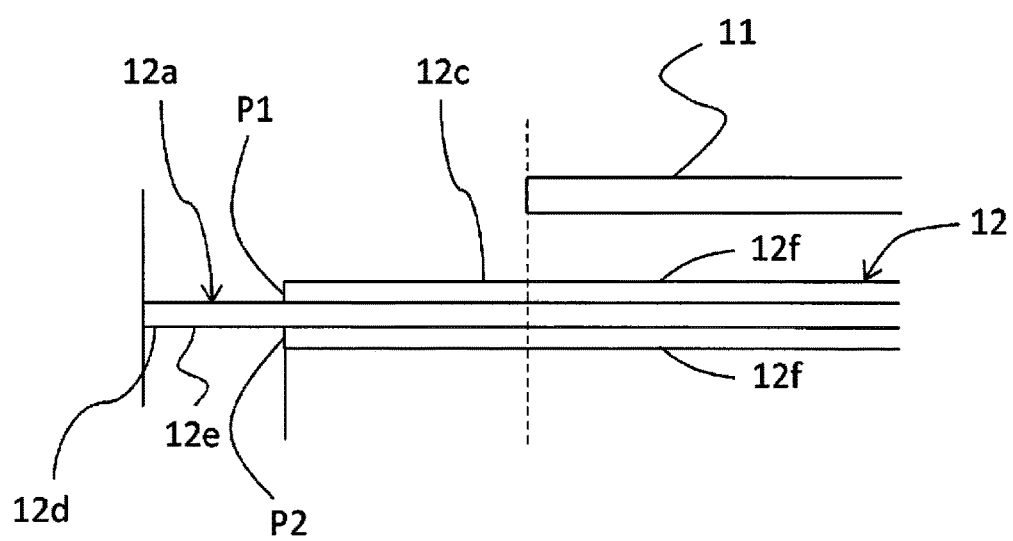
FIG. 4 illustrates the opposing relationship between the positive electrode and the negative electrode of FIG. 3 viewed from the width direction of the positive electrode and the negative electrode.

FIG. 3 illustrates an opposing relationship between the positive electrode and the negative electrode by unfolding a portion near the inner edge in the winding direction of the wound electrode assembly 14. FIG. 4 is a schematic view of FIG. 3 from above. In FIG. 3, the negative electrode mixture layer 12f is represented by a low-density, sand-like pattern, and the positive electrode 11 is represented by a grayish portion, in other words, a high-density, sand-like pattern. The negative electrode 12 includes a rectangular negative electrode core 12e and the negative electrode mixture layer 12f formed on the negative electrode core 12e. A suitable of the negative electrode core 12e is a metal foil based on copper or a copper alloy. The thickness of the negative electrode core 12e is 5 µm to 30 µm, for example.

The negative electrode 12 is larger than the positive electrode 11 and has an exposed portion in which the negative electrode core 12e is exposed in almost a rectangular shape in the front view or the rear view at each end in the longitudinal direction. Each of the negative electrode leads 20a and 20b is welded, for example, to an exposed portion at each end in the longitudinal direction of the negative electrode core 12e. The negative electrode mixture layer 12f is suitably formed on each side in the thickness direction of the negative electrode core 12e. On each side of the negative electrode core 12e, the negative electrode mixture layer 12f is formed in almost the same pattern, for example.

As illustrated in FIG. 3, the negative electrode 12 protrudes considerably in the inward winding direction from the edge where the winding of the positive electrode 11 starts, in other words, the inner edge in the winding direction. Such a protruding portion forms the non-opposing portion 12a. In the example illustrated in FIG. 4, on both sides of the negative electrode core 12e, the positions (P1, P2) of the inner edges in the winding direction of a portion where the negative electrode mixture layers 12f are formed are aligned or almost aligned in the winding direction. And one negative electrode lead 20a, out of the two negative electrode leads 20a and 20b, is connected by welding to the negative electrode core-exposed portion 12d, where the negative electrode mixture layer 12f is not formed, in the non-opposing portion 12a. A protective tape comprising an insulating resin substrate may be attached to the negative electrode lead 20a. In this instance, the protective tape is preferably attached over a range from the negative electrode lead 20a to the surrounding negative electrode core-exposed portion 12d and is more preferably attached over a range from the negative electrode lead 20a to the edge where the winding of the negative electrode mixture layer 12f starts. Further, the one negative electrode lead 20a is connected to the bottom of the case body 16 as described above.

The negative electrode mixture layer 12f contains a negative electrode active material and a binder, for example. The negative electrode 12 can be fabricated by applying a negative electrode mixture slurry containing a negative electrode active material, a binder, and water to both sides of the negative electrode core 12e and compressing the resulting coating films.

The negative electrode active material is not particularly limited provided that lithium ions can be reversibly absorbed and released. Examples of the negative electrode active material include carbon materials, such as natural graphite and artificial graphite; metals to be alloyed with lithium, such as silicon (Si) and tin (Sn); and oxides containing metal elements, such as Si and Sn.

Suitable examples of the negative electrode active material include graphite and silicon oxide represented by $SiO_x$ ($0.5 \leq x \leq 1.6$). The negative electrode mixture layer 12f may contain, as the negative electrode active material, either graphite or silicon oxide represented by $SiO_x$ or both thereof. When graphite and the above-mentioned silicon oxide are used together, a mass ratio of graphite to the silicon oxide is, for example, 99:1 to 80:20 and preferably 97:3 to 90:10.

The silicon oxide represented by $SiO_x$ has a structure, for example, in which Si fine particles are dispersed in a $SiO_2$ phase. Other suitable examples of the negative electrode active material include a Si-lithium silicate composite represented by $Li_{2y}SiO_{(2+y)}$ ($0<y<2$). The Si-lithium silicate composite has a structure in which Si fine particles are dispersed in a lithium silicate phase.

On the surface of particles of the silicon oxide represented by $SiO_x$, a conductive film comprising a material having higher electrical conductivity than the silicon oxide is preferably formed. A material for the conductive film is preferably at least one selected from carbon materials, metals, and metal compounds. Among these materials, carbon materials are particularly preferably used. A carbon film is formed at 0.5 to 10 mass % relative to the mass of $SiO_x$ particles, for example.

As a binder contained in the negative electrode mixture layer 12f, fluororesins, PAN, polyimides, acrylic resins, polyolefins, and the like may be used as in the positive electrode. When a mixture slurry is prepared by using aqueous solvents, CMC or a salt thereof, styrene-butadiene rubber (SBR), polyacrylic acid (PAA) or a salt thereof, or the like is preferably used. These binders may be used alone or in combination.

The separator 13 has a rectangular shape larger than the negative electrode 12 in the winding axis direction (width direction) (vertical direction in FIG. 1). For the separator 13, an ion-permeable insulating porous sheet is used. Specific examples of the porous sheet include a microporous membrane, a woven fabric, and a nonwoven fabric. A material for the separator 13 is suitably an olefin resin, such as polyethylene or polypropylene; cellulose; or the like. The separator 13 may be a multilayer structure including a cellulose fiber layer and a thermoplastic resin fiber layer, such as an olefin resin.

The winding end of the electrode assembly 14 is fixed to the intermediate portion in the winding direction of the electrode assembly 14 by using a fastening tape (not shown). The fastening tape is, for example, an insulating material tape, such as a PP tape. The PP tape is a tape in which an adhesive layer is formed on either side of a porous or nonporous polypropylene substrate.

As illustrated in FIGS. 2 to 4, in the negative electrode 12, the non-opposing portion 12a that does not face the positive electrode 11 via the separator 13 is wound 1.25 turns or more. Further, in the non-opposing portion 12a, the negative electrode mixture layer-formed portion 12c, in which the negative electrode mixture layer 12f is formed, is wound 0.75 turns or more. Neither side of the positive electrode mixture layer-formed portion 12c faces the positive electrode 11. Due to such a configuration, the negative electrode mixture layer-formed portion 12c does not react with the positive electrode 11 in case the secondary battery 10 catches fire. Consequently, a portion near the inner edge in the winding direction of the negative electrode mixture layer-formed portion 12c including the negative electrode core portion remains in a tubular shape at the winding core of the electrode assembly 14. In addition, the negative electrode mixture layer-formed portion 12c has higher strength than a portion in which only the negative electrode core is exposed on both sides. For this reason, the remaining tubular portion acts as an exhaust passage and guides a high-temperature, high-pressure gas generated inside the battery in case of fire, thereby discharging the gas efficiently. As a result, explosion of the secondary battery 10 due to an excessive increase in internal pressure of the secondary battery 10 can be suppressed. Further, as described above, since a metallic tubular member need not be provided at the winding core portion of the secondary battery 10 for efficient discharge of a gas, an increase in cost can be suppressed. Accordingly, it is possible to realize at a low cost a structure that can ensure an exhaust passage at the winding core of the electrode assembly 14 in case the secondary battery 10 catches fire.

In contrast, when the non-opposing portion 12a is wound less than 1.25 turns, gas discharging properties are unsatisfactory due to a decreased proportion of the negative electrode core 12e that remains in a tubular shape in case of fire. Moreover, when the negative electrode mixture layer-formed portion 12c is wound less than 0.75 turns, gas discharging properties are also unsatisfactory in case of fire since a proportion of the negative electrode mixture layer-formed portion 12c is insufficient on a side for leaving a tubular portion in case of fire. Meanwhile, the non-opposing portion 12a is preferably wound 5 turns or less. In such a non-opposing portion 12a, the negative electrode mixture layer-formed portion 12c is preferably wound 4 turns or less. According to these preferable configurations, the capacity required for the secondary battery 10 is readily ensured.

Further, as illustrated in FIG. 3, when the length in the winding direction of the negative electrode core-exposed portion 12d is denoted by a, and the length in the winding direction of the negative electrode mixture layer-formed portion 12c is denoted by b, $1 \leq (b/a)$ is preferably satisfied and $1.25 \leq (b/a)$ is more preferably satisfied. According to these preferable configurations, a tubular portion is more likely to remain in case the secondary battery 10 catches fire, thereby enhancing gas discharging properties. Further, satisfying $(b/a) \leq 2$ is more preferable. According to such a more preferable configuration, the capacity of the secondary battery 10 is readily ensured.

According to the embodiment, two negative electrode leads 20a and 20b are respectively connected to each end in the longitudinal direction of the negative electrode 12. Due to such a configuration, resistance in connection portions between the negative electrode 12 and the case body 16 as a negative electrode terminal can be decreased. Here, it is also possible to expose the negative electrode core 12e on the outermost surface of the electrode assembly 14 without providing the other negative electrode lead 20b, thereby bringing the exposed portion into direct contact with the inner surface of a cylindrical portion of the case body 16. In this instance as well, resistance in connection portions between the negative electrode 12 and the case body 16 as a negative electrode terminal can be decreased since the electric connection between the case body 16 and both ends in the longitudinal direction of the negative electrode 12 is possible.

When the negative electrode active material of the negative electrode mixture layer 12f contains silicon oxide represented by $SiO_x$, the energy density per volume of the negative electrode active material is high. Consequently, the energy density of the secondary battery 10 can be increased. Moreover, when the negative electrode active material contains the above-mentioned silicon oxide, the effects of the present disclosure become prominent since volume changes of the electrode assembly 14 are large during charging and discharging.

EXAMPLES

Hereinafter, the present disclosure will be further described with the Examples. The present disclosure, however, is not limited to these Examples.

Example 1

[Fabrication of Positive Electrode]

As a positive electrode active material for a positive electrode mixture layer, particles of a lithium nickel cobalt aluminum complex oxide represented by $LiNi_{0.88}Co_{0.89}Al_{0.03}O_2$ were used. A positive electrode mixture slurry was prepared by: mixing 100 parts by mass of the positive electrode active material particles, 1.0 part by mass of acetylene black (AB), and 0.9 part by mass of polyvinylidene fluoride (PVDF) as a binder; and further adding an appropriate amount of N-methyl-2-pyrrolidone (NMP) to the resulting mixture. The positive electrode mixture slurry was then uniformly applied to both sides of an elongated positive electrode core formed from a 15 µm-thick aluminum foil. Subsequently, the resulting coating films were dried by heating at a temperature of 100° C. to 150° C. in a heated drying apparatus to remove NMP. Positive electrode mixture layers were formed by rolling the resulting coating films with a roll press. Moreover, the positive electrode after rolling was heat-treated by bringing into contact with a roll heated to 200° C. for 5 seconds. The elongated positive electrode core on which positive electrode mixture layers had been formed was then cut into a predetermined electrode size, thereby fabricating a positive electrode 11 in which a positive electrode mixture layer is formed on each side of a predetermined-size positive electrode core. The fabricated positive electrode 11 had a thickness, of 0.144 mm, a width of 62.5 mm, and a length of 861 mm.

[Fabrication of Negative Electrode]

As a negative electrode active material for the negative electrode mixture layer 12f, a mixture of 95 parts by mass of graphite powders and 5 parts by mass of silicon oxide was used. A negative electrode mixture slurry was prepared by: mixing 100 parts by mass of the negative electrode active material, 1 part by mass of styrene-butadiene rubber (SBR) as a binder, and 1 part by mass of carboxymethyl cellulose (CMC) as a thickening agent; and dispersing the resulting mixture in water. The negative electrode mixture slurry was then applied to both sides of a negative electrode core 12e formed from a 8 µm-thick copper foil, thereby forming a negative electrode mixture layer-formed portion and forming the outermost surface of the electrode assembly 14 from the negative electrode core. Subsequently, the resulting coating films were dried by heating in a heated drying apparatus to remove water. Negative electrode mixture layers 12f were formed by rolling the coating films with a roller of a roll press to have an electrode sheet thickness of 160 µm. The elongated negative electrode core on which negative electrode mixture layers 12f had been formed was cut into a predetermined electrode size, thereby fabricating a negative electrode 12 in which a negative electrode mixture layer is formed on each side of a predetermined-size negative electrode core. The fabricated negative electrode 12 had a width of 64.2 nm and a length of 959 mm.

[Preparation of Nonaqueous Electrolyte Solution]

Ethylene carbonate (EC) and dimethyl carbonate (DMC) were mixed in a volume ratio of 1:3, and 5 parts by mass of vinylene carbonate (VC) was added to 100 parts by mass of the resulting mixture. A nonaqueous electrolyte solution was prepared by dissolving $LiPF_6$ at a concentration of 1.5 mol/L in the prepared mixed solvent.

[Fabrication of Battery]

An aluminum positive electrode lead 19 was attached to the positive electrode 11, and a nickel/copper/nickel negative electrode lead 20a was attached near the inner edge in the winding direction of the negative electrode 12. A wound-type electrode assembly 14 was fabricated by spirally winding the positive electrode 11 and the negative electrode 12 via a polyethylene separator 13. A cylindrical secondary battery 10 was fabricated by: arranging insulating plates 18a and 18b on the upper side and the lower side, respectively, of the electrode assembly 14; welding the negative electrode lead 20a to a case body 16 of a battery case; welding the positive electrode lead 19 to a seal 17; housing the electrode assembly 14 in the case body 16; feeding the nonaqueous electrolyte solution inside the case body 16 in a reduced pressure mode; and sealing an opening of the case body such that the opening end of the case body 16 is engaged with the seal 17 via a gasket. This secondary battery 10 had a battery capacity of 4600 mAh.

In Example 1, the non-opposing portion 12a was wound 1.75 turns. The length a in the winding direction of the negative electrode core-exposed portion 12d and the length b in the winding direction of the negative electrode mixture layer-formed portion 12c shown in Table 1 are values represented by a turn in the winding direction of the electrode assembly 14 as a unit. Accordingly, the amount of winding of the non opposing portion 12a corresponds to "a+b" in Table 1. The length a in the winding direction of the negative electrode core-exposed portion 12d and the length b in the winding direction of the negative electrode mixture layer-formed portion 12c were set to 0.75 turns and 1 turn, respectively.

TABLE 1

| | | Negative electrode | | | | | |
|---|---|---|---|---|---|---|---|
| | Positive electrode Active material | Amount of Si (wt %) | a (turn) | b (turn) | a + b (turn) | Position of negative electrode lead | Number of negative electrode lead | Safety test Number exploded/ number tested |
| Example 1 | $LiNi_{0.88}Co_{0.09}Al_{0.03}O_2$ | 5 | 0.75 | 1 | 1.75 | Inner circumferential portion | 1 | 0/10 |
| Example 2 | $LiNi_{0.88}Co_{0.09}Al_{0.03}O_2$ | 5 | 0.75 | 1.5 | 2.25 | Inner circumferential portion | 1 | 0/10 |
| Example 3 | $LiNi_{0.88}Co_{0.09}Al_{0.03}O_2$ | 5 | 0.75 | 0.75 | 1.5 | Inner circumferential portion | 1 | 0/10 |
| Example 4 | $LiNi_{0.88}Co_{0.09}Al_{0.03}O_2$ | 5 | 0.75 | 3 | 3.75 | Inner circumferential portion | 1 | 0/10 |
| Example 5 | $LiNi_{0.88}Co_{0.09}Al_{0.03}O_2$ | 5 | 0.5 | 0.75 | 1.25 | Inner circumferential portion | 1 | 0/10 |
| Example 6 | $LiNi_{0.91}Co_{0.06}Al_{0.03}O_2$ | 5 | 0.5 | 0.75 | 1.25 | Inner circumferential portion | 1 | 0/10 |
| Example 7 | $LiNi_{0.82}Co_{0.15}Al_{0.03}O_2$ | 5 | 0.75 | 1 | 1.75 | Inner circumferential portion | 1 | 0/10 |
| Example 8 | $LiNi_{0.88}Co_{0.09}Al_{0.03}O_2$ | 10 | 0.75 | 1 | 1.75 | Inner circumferential portion | 1 | 0/10 |
| Example 9 | $LiNi_{0.88}Co_{0.09}Al_{0.03}O_2$ | 0 | 0.75 | 1 | 1.75 | Inner circumferential portion | 1 | 0/10 |
| Example 10 | $LiNi_{0.88}Co_{0.09}Al_{0.03}O_2$ | 5 | 0.75 | 1 | 1.75 | Outer circumferential portion | 1 | 0/10 |
| Example 11 | $LiNi_{0.88}Co_{0.09}Al_{0.03}O_2$ | 5 | 0.75 | 1 | 1.75 | Inner circumferential portion Outer circumferential portion | 2 | 0/10 |
| Comparative Example 1 | $LiNi_{0.88}Co_{0.09}Al_{0.03}O_2$ | 5 | 0.75 | 0.5 | 1.25 | Inner circumferential portion | 1 | 2/10 |
| Comparative Example 2 | $LiNi_{0.88}Co_{0.09}Al_{0.03}O_2$ | 5 | 0.5 | 0.5 | 1 | Inner circumferential portion | 1 | 2/10 |

Example 2

As shown in Table 1, the non-opposing portion 12a was wound 2.25 turns in Example 2. The length a in the winding direction of the negative electrode core-exposed portion 12d and the length b in the winding direction of the negative electrode mixture layer-formed portion 12c were set to 0.75 turns and 1.5 turns, respectively. The rest configuration of Example 2 is the same as Example 1.

Example 3

As shown in Table 1, the non-opposing portion 12a was wound 1.5 turns in Example 3. Both of the length a in the winding direction of the negative electrode core-exposed portion 12d and the length b in the winding direction of the negative electrode mixture layer-formed portion 12c were set to 0.75 turns. The rest configuration of Example 3 is the same as Example 1.

Example 4

As shown in Table 1, the non-opposing portion 12a was wound 3.75 turns in Example 4. The length a in the winding direction of the negative electrode core-exposed portion 12d and the length b in the winding direction of the negative electrode mixture layer-formed portion 12c were set to 0.75 turns and 3 turns, respectively. The rest configuration of Example 4 is the same as Example 1.

Example 5

As shown in Table 1, the non-opposing portion 12a was wound 1.25 turns in Example 5. The length a in the winding direction of the negative electrode core exposed portion 12d and the length b in the winding direction of the negative electrode mixture layer-formed portion 12c were set to 0.5 turns and 0.75 turns, respectively. The rest configuration of Example 5 is the same as Example 1.

Example 6

As shown in Table 1, particles of a lithium nickel cobalt aluminum complex oxide represented by $LiNi_{0.91}Co_{0.06}Al_{0.03}O_2$ were used as a positive electrode active material in Example 6. In addition, the thickness of the positive electrode 11 was set to 0.140 mm. The rest configuration of Example 6 is the same as Example 5.

Example 7

As shown in Table 1, particles of a lithium nickel cobalt aluminum complex oxide represented by $LiNi_{0.82}Co_{0.15}Al_{0.03}O_2$ were used as a positive electrode active material in Example 7. In addition, the thickness of the positive electrode 11 was set to 0.150 mm. The rest configuration of Example 7 is the same as Example 1.

Example 8

As shown in Table 1, silicon oxide in the negative electrode active material was changed to 10 parts by mass in Example 8. The rest configuration of Example 8 is the same as Example 1.

Example 9

As shown in Table 1, graphite alone was used as the negative electrode active material while setting silicon oxide in the negative electrode active material to 0 parts by mass in Example 9. The rest configuration of Example 9 is the same as Example 1.

Example 10

As shown in Table 1, the connection position of the negative electrode lead to the negative electrode was changed from the inner circumferential portion to the outer circumferential portion in Example 10. The rest configuration of Example 10 is the same as Example 1.

Example 11

As shown in Table 1, two negative electrode leads were connected to the inner circumferential portion and the outer circumferential portion, respectively, in Example 11. The rest configuration of Example 11 is the same as Example 1.

Comparative Example 1

As shown in Table 1, the non-opposing portion 12a was wound 1.25 turns in Comparative Example 1. The length a in the winding direction of the negative electrode core-exposed portion 12*d* and the length b in the winding direction of the negative electrode mixture layer-formed portion 12*c* were set to 0.75 turns and 0.5 turns, respectively. The rest configuration of Comparative Example 1 is the same as Example 1.

Comparative Example 2

As shown in Table 1, the non-opposing portion 12*a* was wound 1 turn in Comparative Example 2. Both of the length a in the winding direction of the negative electrode core-exposed portion 12*d* and the length b in the winding direction of the negative electrode mixture layer-formed portion 12*c* were set to 0.5 turns. The rest configuration of Comparative Example 2 is the same as Example 1.

[Test Method]

Each secondary battery of Examples 1 to 11 and Comparative Examples 1 and 2 underwent constant-current (CC) charging at a charging current of 0.3 C (=1380 mA), followed by constant-voltage (CV) charging at 4.2 V to a charging end current of (1/50)C (=92 mA). Subsequently, the charged secondary battery was heated to 600° C. to allow the secondary battery to catch fire. Ten samples (n=10) underwent the above-described test, thereby performing a safety test to observe whether the secondary battery exploded or not.

[Test Results]

As the test results in the column of "safety test" Table 1 show, any of the sample secondary batteries in Examples 1 to 11 did not explode. Meanwhile, two out of ten sample secondary batteries exploded in the Comparative Examples. In Examples 1 to 11, by winding the non-opposing portion 12*a* 1.5 turns or more and by winding the negative electrode mixture layer-formed portion 12*c* 0.75 turns or more, it was presumably possible to ensure an exhaust passage at the winding core when the secondary battery caught fire, thereby preventing explosion. Meanwhile, in the safety test results for the Comparative Examples, a tubular shape was not confirmed at the winding core from the observation of the secondary battery after fire. Accordingly, insufficient discharge of a gas presumably caused explosion in the Comparative Examples.

It is considered that the above-described effects of the embodiments and working examples can be expected not only when lithium nickel oxide is selected as a positive electrode material, but also when lithium cobalt oxide, lithium nickel cobalt manganese oxide, or a mixture thereof is selected as a positive electrode material.

As illustrated in FIG. 4, the foregoing describes an instance in which the positions of the inner edges in the winding direction of the negative electrode mixture layers 12*f* on both sides of the negative electrode core 12*e* are the same or almost the same in the non-opposing portion 12*a* of the negative electrode. Meanwhile, the positions of the inner edges in the winding direction of the negative electrode mixture layers 12*f* on both sides of the negative electrode core 12*e* may be different. In this instance, a portion in which the negative electrode mixture layer 12*f* is formed on at least either side in the non-opposing portion 12*a* becomes a negative electrode mixture layer-formed portion. Accordingly, the negative electrode mixture layer-formed portion may have a negative electrode mixture layer formed only on either side. Meanwhile, from a viewpoint of ensuring an exhaust passage in case of fire, the negative electrode mixture layer-formed portion is preferably formed on each side of the negative electrode core.

REFERENCE SIGNS LIST

10 Nonaqueous electrolyte secondary battery (secondary battery)
11 Positive electrode
12 Negative electrode
12*a* Non-opposing portion
12*b* Opposing portion
12*c* Negative electrode mixture layer-formed portion
12*d* Negative electrode core-exposed portion
12*e* Negative electrode core
12*f* Negative electrode mixture layer
13 Separator
14 Wound electrode assembly (electrode assembly)
15 Battery case
15 Case body
17 Seal
18*a*, 18*b* Insulating plate
19 Positive electrode lead
20*a*, 20*b* Negative electrode lead
21 Over portion
22 Filter
23 Lower valve
24 Insulator
25 Upper valve
26 Cap
27 Gasket

The invention claimed is:

1. A cylindrical nonaqueous electrolyte secondary battery comprising:
   a wound electrode assembly formed by spirally winding, via a separator, a positive electrode and a negative electrode in which a negative electrode mixture layer is formed on a negative electrode core;
   a nonaqueous electrolyte; and
   a package that houses the wound electrode assembly and the nonaqueous electrolyte, wherein:
   the negative electrode includes a non-opposing portion that is wound 1.25 turns or more from an inner edge in a winding direction of the wound electrode assembly without facing the positive electrode via the separator;
   the non-opposing portion includes a negative electrode mixture layer-formed portion in which the negative electrode mixture layer is formed on at least either side continuously in an inward winding direction from an outer edge of the non-opposing portion in the winding direction, and a negative electrode core-exposed portion in which the negative electrode mixture layer is not formed on either side continuously in an outward winding direction from the inner edge of the non-opposing portion in the winding direction;
   the negative electrode mixture layer-formed portion is wound 0.75 turns or more, and
   a length in the winding direction of the negative electrode core-exposed portion, denoted as a, and a length in the winding direction of the negative electrode mixture layer-formed portion, denoted as b, satisfy 1≤(b/a).

2. The cylindrical nonaqueous electrolyte secondary battery according to claim 1, wherein:
   a negative electrode lead is connected to the negative electrode core-exposed portion.

3. The cylindrical nonaqueous electrolyte secondary battery according to claim 1, wherein the negative electrode mixture layer contains silicon oxide represented by $SiO_x$ (0.5≤x≤1.6).

4. The cylindrical nonaqueous electrolyte secondary battery according to claim 2, wherein
the negative electrode mixture layer contains silicon oxide represented by $SiO_x$ (0.5≤x≤1.6).

* * * * *